US010541931B2

(12) United States Patent
Grant et al.

(10) Patent No.: US 10,541,931 B2
(45) Date of Patent: *Jan. 21, 2020

(54) DATA CONGESTION CONTROL IN HIERARCHICAL SENSOR NETWORKS

(71) Applicant: International Business Machines Corporation, Armonk, NY (US)

(72) Inventors: Robert Grant, Atlanta, GA (US); Kelley Anders, East New Market, MD (US); Faisal Ghaffar, Castle Dunboyne (IE); Ahmad Abdul Wakeel, Lucan (IE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/263,571

(22) Filed: Jan. 31, 2019

(65) Prior Publication Data

US 2019/0166054 A1    May 30, 2019

Related U.S. Application Data

(63) Continuation of application No. 15/818,648, filed on Nov. 20, 2017, now Pat. No. 10,298,505.

(51) Int. Cl.
*H04L 12/825* (2013.01)
*H04L 29/08* (2006.01)
(Continued)

(52) U.S. Cl.
CPC ............. *H04L 47/25* (2013.01); *H04L 12/66* (2013.01); *H04L 43/16* (2013.01); *H04L 47/12* (2013.01); *H04L 67/125* (2013.01); *H04W 4/70* (2018.02)

(58) Field of Classification Search
CPC ......... H04L 47/25; H04L 12/66; H04L 47/12; H04L 67/125; H04L 43/16; H04W 4/70
See application file for complete search history.

(56) References Cited

U.S. PATENT DOCUMENTS

2004/0136379 A1    7/2004    Liao et al.
2013/0138830 A1    5/2013    Fang
(Continued)

OTHER PUBLICATIONS

National Institute of Standards and Technology; The NIST Definition of Cloud Computing; Special Publication 800-145; Dec. 13, 2016; pp. M-7 to M-13.

*Primary Examiner* — Dady Chery
(74) *Attorney, Agent, or Firm* — Garlick & Markison; Timothy W. Markison; Bruce E. Stuckman

(57) ABSTRACT

A data congestion control can operate in a hierarchical sensor network. A first data rate of data received from a set of devices is determined to compare unfavorably to a congestion threshold. A most favorable negotiation score of a set of negotiation scores corresponding to the set of devices is determined. A proposed reduced transmission rate that is less than a current transmission rate of the device and that compares favorably a boundary conditions of the device is determined. A transmission rate reduction request is generated for transmission to the one of the set of devices that indicates the proposed reduced transmission rate. An updated data rate of the data received from the set of devices is determined, and a difference between the updated data rate and the first aggregated data rate corresponds to a reduction of rate of transmission by the device.

20 Claims, 8 Drawing Sheets

(51) Int. Cl.
  *H04L 12/801* (2013.01)
  *H04L 12/66* (2006.01)
  *H04L 12/26* (2006.01)
  *H04W 4/70* (2018.01)

(56) References Cited

U.S. PATENT DOCUMENTS

2014/0153419 A1 6/2014 Beattie, Jr. et al.
2017/0126578 A1 5/2017 Amulothu et al.
2017/0187642 A1 6/2017 Nolan et al.
2017/0188178 A1 6/2017 Vrabete
2018/0341706 A1 11/2018 Agrawal et al.

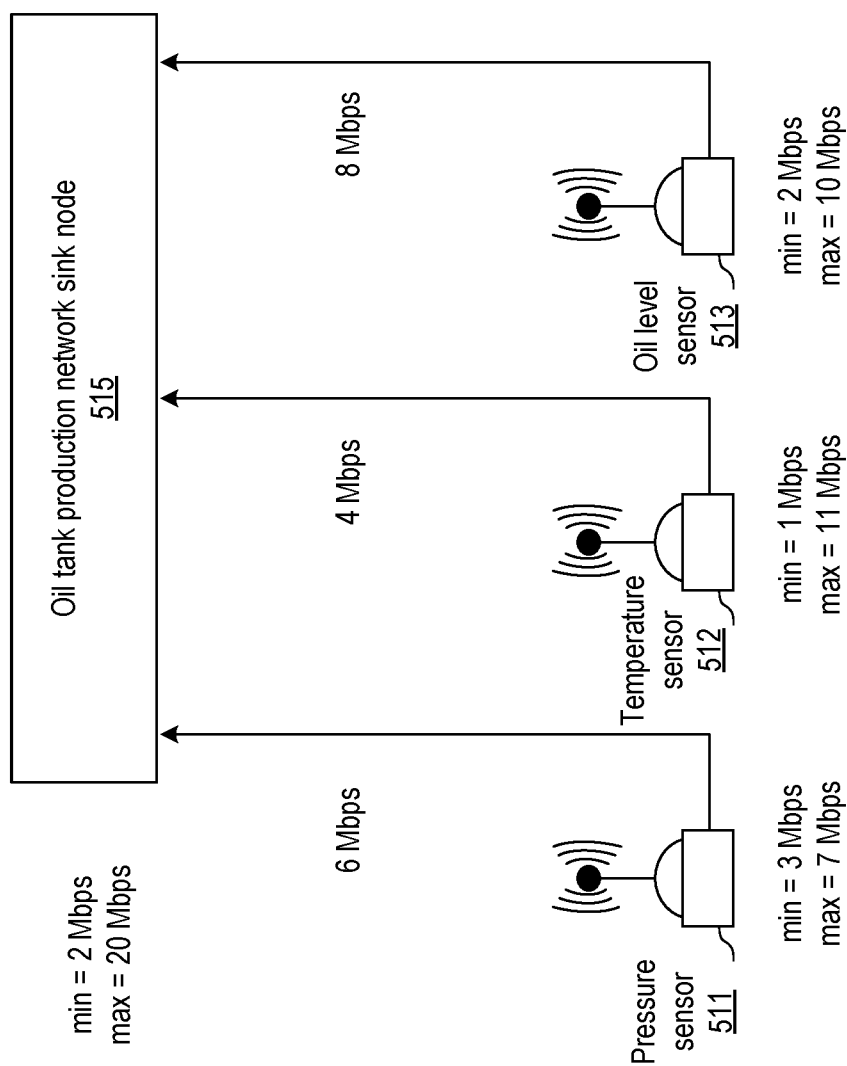

DATA CONGESTION CONTROL IN HIERARCHICAL SENSOR NETWORKS

BACKGROUND

Technical Field of the Invention

This invention relates generally to computer networks and more particularly to hierarchical sensor networks.

SUMMARY

Embodiments of the present invention disclose a method, computer program product, and system for data congestion control in a hierarchical sensor network. Data is received from a set of devices, where the data includes sensor data transmitted from each of the set of devices, and where the sensor data transmitted by the each of the set of devices corresponds to one of a plurality of sensor data types. A first aggregate data rate of the data received from the set of devices is determined to compare unfavorably to a congestion threshold. A set of negotiation scores corresponding to the set of devices is determined, wherein an order of the set of negotiation scores is based on priorities of corresponding ones of the plurality of sensor data types. A most favorable negotiation score of the set of negotiation scores is determined, and transmission rate boundary conditions of a one of the set of devices that corresponds to the most favorable negotiation score is determined.

A proposed reduced transmission rate is determined for the one of the set of devices. The proposed reduced transmission rate is less than a current transmission rate of the one of the set of devices and wherein the proposed reduced transmission rate compares favorably to the transmission rate boundary conditions of the one of the set of devices. A transmission rate reduction request is generated for transmission to the one of the set of devices that indicates the proposed reduced transmission rate. An updated aggregated data rate of the data received from the set of devices is determined. A difference between the updated aggregated data rate and the first aggregated data rate corresponds to a reduction of rate of transmission of the sensor data by the one of the set of devices in response to receiving the transmission rate reduction request.

When the updated aggregate data rate compares unfavorably to the congestion threshold, a set of additional transmission rate reduction requests are generated, each for transmission to a corresponding device of a subset of the set of devices. Each of the set of additional transmission rate reduction requests indicate an additional proposed reduced transmission rate, where each additional proposed reduced transmission rate is less than a current transmission rate of the corresponding device of the subset. Each additional proposed reduced transmission rate compares favorably to determined transmission rate boundary conditions for the corresponding device of the subset, and each of the set of additional transmission rate reduction requests is generated and transmitted one at a time, sequentially through the subset of the set of devices with respect to an order of the corresponding negotiation scores starting from a second most favorable negotiation score, until a most recent one of a plurality of subsequently determined updated data rates compares favorably to the congestion threshold. Each of the plurality of subsequently determined updated data rates are determined in response to the transmission of the each of the set of additional transmission rate reduction requests.

BRIEF DESCRIPTION OF THE DRAWINGS

FIG. 2A is a schematic block diagram of a specific example of a data congestion control system according to an embodiment of the present invention;

DETAILED DESCRIPTION

Figure 1:
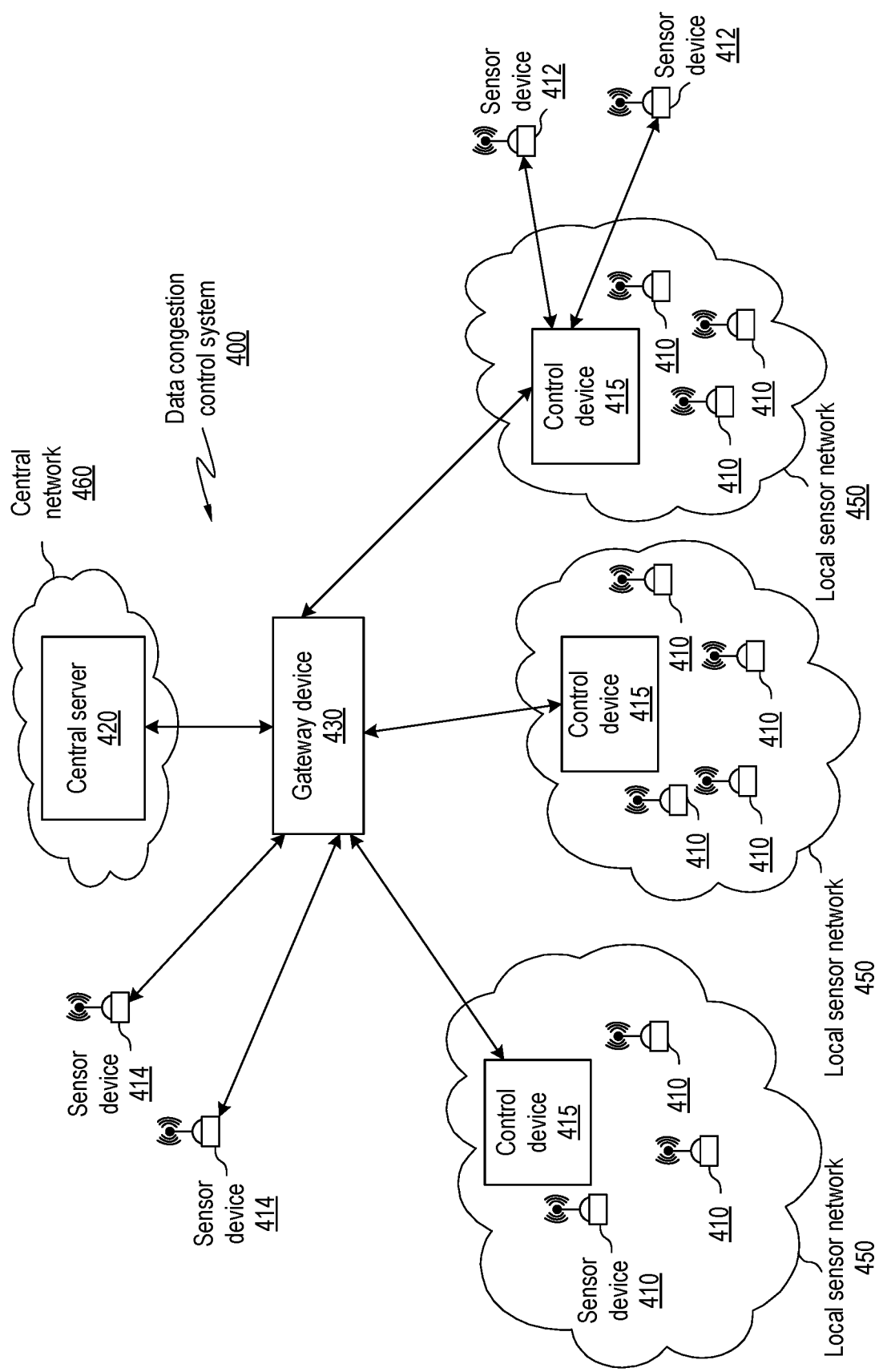
FIG. 1 is a schematic block diagram of a data congestion control system according to various embodiments of the present invention.

FIG. 1 presents a data congestion control system 400 that includes a plurality of local sensor networks 450 and a central network 460, communicating bidirectionally via a gateway device 430. Each local sensor network 450 can include a plurality of sensor devices 410 and a control device 415. Each control device 415 can receive sensor data from the sensor devices 410 in its local sensor network 450, or by otherwise utilizing a wired and/or wireless connection with the sensor devices 410. In some embodiments, some or all control devices 415 also receive sensor data from one or more sensor devices 412 that are not included in the sensor network via a separate wired and/or wireless connection. The control device 415 can also communicate control data to the sensor devices 410 and/or 412 by utilizing communication by utilizing a wired and/or wireless connection with the sensor devices 410 and/or 412. Each local sensor network 450 can utilize control device 415 to bidirectionally communicate with gateway device 430.

Some or all local sensor networks 450 can be implemented as an Internet of Things (IoT) network and/or Wireless Sensor Network (WSN), for example, where the control device 415 is implemented by utilizing a sink node of a WSN and the sensor devices 410 include heterogeneous wireless sensors that are implemented by utilizing a sensor node of a WSN. Such sink nodes and sensor nodes can be implemented by utilizing nodes of a cloud computing network.

The sensor devices 410, 412, and/or 414 and/or control devices 415 can each include a processor and/or a memory, and can be implemented by utilizing one or more computing devices, for example, utilizing an interface to communicate within the local sensor network. The control device may utilize the same interface or a separate interface to communicate with gateway device 430. The sensor devices 410, 412, and/or 414 can further include one or more sensors that collect data. This data can be pre-processed by the sensor devices 410, 412, and/or 414 prior to transmission and/or can be transmitted as raw data for processing by the control device 415 and/or the central network 460. Each local sensor network can include the same or different number of sensor devices collecting the same or different type of data. Some or all the sensor devices can correspond to Internet of Things (IoT) and/or Wireless Sensor Network (WSN) sensor devices.

The gateway device 430 can include hardware and/or software operable to route data to and from the sensor networks and the central network. In some embodiments, one or more sensor devices 414 can be configured to communicate directly with the central network 460 via a direct wired and/or wireless connection to gateway device 430. The data congestion control system can include multiple gateway devices 430, for example, each communicating with their own set of local sensor networks 450.

The central network 460 can include one or more central servers 420, for example, configured to process raw and/or processed sensor data received from the local sensor networks 450 via gateway device 430 and/or to generate control data for transmission to the control devices 415 of the local sensor networks 450. In some embodiments, central network 460 can be implemented by utilizing the cloud computing environment 50. For example, the central network 460 can include or otherwise interface with computing devices 45A-N, enabling administrators or other users to monitor and/or control the central network 460. The data congestion control system 400 can include multiple central networks 460, for example, each communicating with one or more gateway devices 430.

The data congestion control system 400 can be implemented as a hierarchical IoT network or a Wireless Sensor Tree network. The sensor devices 410 and 412 can correspond to a first, lowest level of the hierarchy, the control devices 415 can correspond to a second level of the hierarchy, the gateway device 430 can correspond to a third level of the hierarchy, and the central server 420 can correspond to the fourth, highest level of the hierarchy. Such a hierarchical network can include any number of levels, and other embodiments can include additional or fewer hierarchical levels. The sensor devices 410, 412, and/or 414 can be constrained devices with small memories, low bandwidth and limited power resources. These small edge sensor devices can be used to sense events ranging from simple readings (e.g. sensing room temperature) to more important and sensitive measures (e.g. intruder detection, wildfire detection, earthquake detection, etc.). Raw data collected using these resource-constrained devices at the edge of network can be queried by one or more powerful devices at upper layer of the hierarchy. Thus, data flows from bottom to top, where edge nodes in the network such as control devices 415 send data to a central node or an agent node such as central server 420 at the upper level for data processing. In this sense, one device at any level other than bottom level in the hierarchy might be receiving data from one or more devices of different types.

Sensor devices 410, 412, and 414 of the data congestion control system 400 can produce data of one or more types, and these types of data can have different priorities in a given application context. Some of the data type examples are weather, traffic, environment noise monitoring, water quality monitoring, heart monitoring, steps count and activities, etc. Moreover, some sensor devices can produce more than one type of data. For example, a wearable sensor device can produce data corresponding to steps taken by a user, total hours slept by the user, and altitude of the user, etc. Other sensor devices may produce data for both temperature and humidity data and/or can produce data corresponding to pH, dissolved oxygen and/or conductivity (salinity) of sampled water. Each data reading can be an actual measurement from the sensor device or a derived measurement as an end product of a computation, executing an algorithm, or otherwise processing of raw data. Sensor devices 410, 412, and/or 414 can be involved in sending, receiving and processing of different types of data simultaneously.

The data congestion control system is operable to handle cases where one or more receiving devices such as control devices 415 and/or gateway devices 430 become overloaded and/or otherwise congested with data. A rare and/or extreme incident could cause an increase in data inflow from the sensor devices, for example, when one or more of the sensor devices 410, 412, and/or 414 are operable to only transmit its collected data when the collected data compares favorably to a threshold, and/or when one or more sensor device otherwise transmits data at a higher rate in response to the incident. The data congestion control system 400 is operable to detect potentially overloaded devices that are receiving data from other devices in the system, and is further operable to initiate a negotiation process reducing the data transmission from some or all of the corresponding devices in the system over time. This can include a data transmission reduction at the lowest hierarchical levels, where the transmission rate of at least one sensor devices is reduced. Alternatively or in addition, this can include a data transmission reduction at higher levels, where the transmission rate of at least one control device 415 and/or gateway device 430 is reduced. The negotiation process can be performed such that quality of service metrics of each device are honored while enabling each device to operate at within its normal operating boundaries. In particular, the data congestion control system 400 can be operable to monitor the resource consumption such as memory and/or CPU of devices 410, 412, 414, 415, 420, and/or 430, to monitor the data priority of the data types being transferred to respective devices 415, 420, and/or 430, and/or to monitor the operating bounds of devices 410, 412, 414, 415, 420, and/or 430, such as the minimum and/or maximum data rate at which these devices can receive and/or transmit data. The data congestion control system can be further operable to calculate a negotiation score of the devices 410, 412, 414, 415, and/or 430. If a higher hierarchical level device such as the central server 420 is overloaded and/or at risk of being overloaded, the negotiation scores of devices 410, 412, 414, 415, and/or 430 can be used to determine to throttle the data transmission of devices 410, 412, 414, 415, and/or 430.

Some or all of this monitoring and negotiation can occur locally. For example, some or all devices can monitor their own resource consumption, priority of one or more types of data being received, and/or operating boundaries of devices from which data is collected, and the some or all device can determine to initiate their own negotiation process based on this monitoring. Some or all of the monitoring and negotiation can be performed at higher level devices, for example, where the central server 420 monitors one or more control devices 415 by receiving resource consumption data of the control devices 415 and determines to initiate a negotiation process on a control device based on received resource consumption data. The central server 420 can send control data to the control device that instructs the control device to perform its own negotiation process, where the control device performs the negotiation based on negotiation scores of its sensor devices. Alternatively or in addition, the central server 420 can send control data to a control device 415 that instructs the control device to throttle transmission of particular sensor devices, based on, for example, data type priorities and/or operating boundaries of the sensor devices stored and/or received by the central server 420.

A control device 415 can determine priorities for the types of data received and/or for the corresponding respective sensor devices by fetching priority data from local memory and/or receiving priority data from the central server 420 and/or from another device. The priorities can include a score and/or ranking of the types of data and/or respective sensor devices. For example, an administrator can set these priorities and/or the central device can calculate these priorities by executing an algorithm to calculate a priority score for each sensor device 410, where the priority score is a function of quality of service metrics of the sensor devices; a function of past, present, and/or projected performance data of the sensor device; a function of past, present, and/or projected resource allocation data of the sensor device; a function of past, present, and/or projected outage data sensor device; and/or past, present, and/or a function of projected environmental condition data. This algorithm can include ranking each sensor device by calculated priority score. In some embodiments, the control device performs such computations locally for its respective sensor devices.

A control device 415 can determine to begin the congestion negotiation process in response to determining that memory capacity compares unfavorably to a threshold and/or that the incoming transmission rate compares unfavorably to a maximum reception rate threshold. The control device 415 can determine negotiation scores for each sensor device 410 in its network and/or can otherwise rank the control devices 415. The negotiation score of a device is based on determined priority of the device and/or the type of data transmitted by the device. In some embodiments, the negotiation score is calculated by determining a ranking of devices by executing an algorithm that is a function of at least the priorities of each device and quality of service metrics of each device. The priorities and quality of service metrics can each be assigned weights. These weights can be preset, can be determined by an administrator, or can be calculated by the device performing the negotiation. For example, calculating the negotiation score can include performing the calculation $NS(n)=w_p*P(n)+w_q*Q(n)$, where $NS(n)$ is the negotiation score for device n, $w_p$ is the priority weight, $P(n)$ is the priority score of device n, $w_q$ is the quality of service weight, and $Q(n)$ is the quality of service score or ranking of device n. In some embodiments, the corresponding devices can be ranked by their negotiation score, from most favorable negotiation score to least favorable negotiation score, to dictate the order by which negotiation will be conducted.

Once the negotiation scores are determined, a control device 415 can begin the congestion negotiation process by identifying the sensor device with the most favorable negotiation score. Based on determined boundary conditions of this identified sensor device, the control device can generate a request for transmission to this identified sensor device to reduce its transmission rate. Based on comparing a new data reception rate to the threshold and/or comparing memory capacity to a threshold, the control device can determine whether congestion conditions remain unfavorable, and if so, can determine to continue negotiation with a second sensor device with the second most favorable negotiation score by generating a request for transmission to this second sensor device to reduce its transmission rate. In some embodiments, negotiation scores are recalculated after negotiation with each device is conducted. For example, the recalculated negotiation scores can reflect changes in priorities of data types or changes in quality of service metrics.

In some embodiments, the negotiation score of devices with which negotiation has already been performed are reassigned a highest or otherwise least favorable negotiation score to ensure that negotiations will not be performed with these devices again until negotiations are performed with the remaining devices.

The control device can continue negotiation with subsequent devices with corresponding next most favorable most favorable negotiation scores until the congestion conditions are determined to be favorable, at which point the congestion negotiation process ends. Later, if an event determined to cause the unfavorable congestion conditions ends or if available memory capacity and/or reception rate is determined to be higher than a threshold, the control device can notify all devices to resume transmission at their previous and/or normal rate, or can one by one negotiate with devices, for example, starting with a device that reduced its rate during the congestion negotiation process with the least favorable negotiation score or the device with which negotiation was most recent, to resume their normal and/or previous transmission rate, until a threshold amount of memory capacity and/or data reception rate are no longer available.

A control device 415 can determine boundary conditions, such as the minimum and maximum transmission rates for its respective sensor devices, by fetching boundary condition data from local memory and/or by receiving boundary condition data from the central server 420, from the sensor devices themselves, and/or from another device. In some embodiments, the maximum transmission rate of a sensor device can determined based on data collection rate and/or data processing rate of the sensor device, for example, where the data collection rate is the rate at which the sensor device collects its data, where the data processing rate is the rate at which the sensor device performs calculations on or otherwise processes the raw data before transmission, and where the maximum transmission rate cannot exceed or otherwise compare unfavorably to the data collection rate and/or the data processing rate. In some embodiments, the minimum transmission rate of a sensor device can be determined based on a memory buffer size of the sensor device, where the sensor device stores some amount of collected data before transmission if the device is not transmitting at its maximum transmission rate. In some embodiments, for example, if the sensor device includes a camera collecting video data, the maximum transmission rate can be determined based on the maximum resolution of video that can be transmitted, and the minimum transmission rate can be determined based on the minimum video resolution that can be transmitted without losing content.

In some embodiments, the minimum transmission rate can be determined based on an acceptable data loss threshold, for example, dictating a percentage of data that can be discarded or otherwise not transmitted. In some embodiments, the acceptable data loss threshold of a sensor device is determined only when negotiation is initiated, for example, based on an amount of congestion that needs to be reduced. In some embodiments, the acceptable data loss threshold is determined based on the priority of the sensor device relative to the priority of the other sensor devices. In some embodiments, the acceptable data loss threshold is set by an administrator and/or is calculated by executing an algorithm that is a function of the type of data, the priority of the sensor device, past, present, and/or projected performance data of the control device and/or other devices in the system; a function of past, present, and/or projected resource allocation data of the control device and/or other devices in the system; a function of past, present, and/or projected outage data of the control device and/or other devices in the system; a function of past, present, and/or a function of projected environmental condition data. In some embodiments, the acceptable data loss threshold can correspond to a resolution of the transmitted data, such as a video resolution, and can be determined, for example, based on the type of video content.

The control device 415 can request that a sensor device selected for negotiation reduce its current transmission rate by transmitting at its minimum transmission rate. Alternatively, based on the acceptable data loss threshold, performance data, and/or other quality of service metrics, the control device can instead request that the sensor device transmit at a higher or lower rate than the minimum transmission rate. In some embodiments, the control device 415 may not know the boundary transmission rates of the devices from which data is received, and instead of determining a particular reduced rate in the by which the data will be transmitted by the identified device, the device performing negotiation can simply request that the identified device begin transmitting at its minimum transmission rate, and the identified device is responsible for determining its minimum transmission rate and reducing to the minimum transmission rate accordingly. In some embodiments, a control device performing negotiation may not wish for the lowest priority device to transmit at the minimum transmission rate. The control device may instead determine, for example, by performing an optimization algorithm across all the devices, to calculate an optimized reduced transmission value that is higher than the minimum transmission rate of the identified device but lower than the current transmission rate of the identified device, based on the priorities, transmission rate boundary conditions, and current transmission rates of all devices from which data is received.

In some embodiments, a request to reduce transmission rate can indicate a window of time, corresponding to a window of time of the negotiation process, by which to transmit at the requested transmission rate. A sensor device, or other device that received the request to reduce the rate of transmission, can resume transmission at its previous rate and/or at a normal rate after the window of time has elapsed. In some embodiments, the sensor device will continue transmitting at the requested rate until it receives a transmission from the control device that includes a new specified transmission rate and/or an indication to resume transmission at the previous rate and/or at a normal rate.

In some embodiments, a sensor device 410, 412, and/or 414, or other transmitting device, transmits more than one data type. In response to receiving a request to reduce the transmission data rate, the sensor device 410 can determine to reduce the data rate of the different data types by different amounts, for example, where some data types are transmitted at the same or increased rate and/or where other data types are not transmitted at all. A subset of data types whose data rate should be reduced and/or a set of data rates corresponding to some or all of the data types can be indicated in the request to the sensor device or other transmitting device, and/or the sensor device and/or other transmitting device can determine which data types are to be reduced, and by how much to reduce these data types. This differing of data rate reduction across different data types can correspond to differing priorities for the different data types sent by the same device, and can further correspond to different negotiation scores for each data type sent by the same device. For example, a sensor device that transmits temperature readings and emergency signals can be assigned two different negotiation scores corresponding to the temperature data and the emergency signals. If temperature data of the sensor device 410 corresponds to the lowest priority and/or most favorable negotiation score determined by a control device 415, the control device 415 can perform negotiation regarding only the transmission rate of the temperature data, for example, by transmitting a request to reduce the transmission rate of the temperature data, and the emergency signals can continue to transmit at the normal rate. Similarly, if a device alternates between transmission of different types of data, the priority and/or most favorable negotiation score of the device can increase or decrease based on the current type of data that is transmitted.

In some embodiments, the sensor device can determine to deny a received request to reduce their transmission rate, for example, if the requested rate falls outside its boundary transmission rates, compares unfavorably to quality of service requirements, and/or compares unfavorably to other threshold conditions. In this case, the control device, upon determining that the sensor device has refused the new rate, can override the denial, can request a different transmission rate from the sensor device, and/or can continue the negotiation with the next lowest priority device. In some embodiments, the sensor device can determine to accept the request to reduce the transmission rate, but only agree to reduce the transmission rate by an amount that is smaller than the requested change in transmission rate, for example, based on determining that this smaller change in transmission rate meets quality of service requirements; based on reevaluating its boundary conditions and determining a new minimum transmission rate and determining to transmit at the new minimum transmission rate; based on quality of service considerations, based on an evaluation CPU and/or memory performance and capacity conditions; based on a calculation; based on control data received from another device; and/or based on other factors.

While performing negotiation has been discussed with regards to control device 415, negotiation can be performed by any device at any hierarchical level of the system, and boundary conditions, priority, quality of service, and/or negotiation scores can be determined with respect to any device in the system from which data is received. For example, the gateway device 430 can generate boundary conditions, priority, quality of service, and/or negotiation scores for each of the plurality of control devices 415 from which data is received for use in a congestion negotiation process initiated by the gateway device in response to data congestion of the gateway device. Such boundary conditions, priority, quality of service, and/or negotiation scores of each control device can based on the type of data being received, based on determined CPU consumption, memory capacity, or other performance metrics, based on an entity associated with each control device's local sensor network 450, and/or based on other relevant criteria. In such examples, the gateway device 430 can be implemented by utilizing another control device 415, where data is received from additional control devices at one or more lower hierarchical levels.

Utilizing this data congestion control process can benefit the data congestion control system by aiding in power saving for battery operated devices. For example, many sensor devices may be battery powered, and continuous communication from such devices may not be possible in certain circumstances. A trade-off maybe required to lower the duty cycle in order to minimize the power consumption. In such a scenario, instructing a sensor device to hold off in transmitting its data and not transmit continuously can save battery power while ensuring that data is transmitted when necessary, for example, when the collected data compares favorably to a threshold. Utilizing data congestion control in this manner also addresses low latency requirements in distributed environments by reducing the network traffic without compromising quality of service, and allow for users to continue with application/service usage based on incremental levels rather than experiencing a full outage in the case of an extreme incident.

An example embodiment of the data congestion control system 400 can be utilized in a sensors network that collects data in oil wells, where various sensors can be deployed throughout various stages of oil extraction. The sensor devices 412 and/or 416 can include seismic sensors, which can be used to collect data about area surface to determine the sites of oil deposits, and/or other environmental sensors. The sensor devices 410 can include heterogeneous, wireless sensors that can be used for other functions such as oil rig monitoring, equipment maintenance, refinery monitoring, pipeline and/or wellhead monitoring. In particular, the local sensor networks 450 can include an oil compressor IoT network and/or an oil production tank IoT network. The sensor devices 410 of the oil compressor IoT network and/or the oil production tank IoT network can include their temperature sensors, pressure sensors, oil level sensors, flow sensors, and/or other sensors that send data to control device 415, which can be implemented by a sink node of the compressor IoT network and/or the oil production tank IoT network. Under normal operating conditions, temperature, pressure, flow, sensors transmit data to their relevant sink nodes, which in turn are transmitting to a central node or gateway such as gateway device 430 for further processing. However, in an event such as an earthquake, sinks nodes also start receiving data from other high priority sensors such as the seismic sensors. This can result in data congestion at the sink node, leading to overloading of resources and finally halting the operation of sink node. Thus, the data congestion control system can be utilized in such a network to mitigate this congestion.

FIG. 2A illustrates an oil tank production network of such an embodiment, where an oil tank production network sink node 515 receives constant data from a pressure sensor 511, temperature sensor 512, and oil level sensor 513. The oil tank production network sink node 515 can be implemented by utilizing a control device 415 of FIG. 1, and pressure sensor 511, temperature sensor 512, and/or oil level sensor 513 can be implemented by utilizing the sensor devices 410 or 412 of FIG. 1.

Suppose the pressure sensor has a minimum transmission rate of 3 Mbps and a maximum transmission rate of 7 Mbps, the temperature sensor has a minimum transmission rate of 1 Mbps and a maximum transmission rate of 11 Mbps, and the oil level sensor has a has a minimum transmission rate of 2 Mbps and a maximum transmission rate of 10 Mbps. Suppose the sink node 515 has a minimum reception rate of 2 Mbps and maximum reception rate of 20 Mbps. For example, this maximum reception rate of 20 Mbps can be due to a memory capacity of the sink node. Suppose that at a first time corresponding to normal operation, the pressure sensor 511, temperature sensor 512, and oil level sensor 513 are transmitting data for reception by the sink node 515 at rates of 6 Megabits per second (Mbps), 4 Mbps, and 8 Mbps respectively. Thus, the sink node 515 is receiving data at a rate of 18 Mbps during normal operation, which is within its boundary reception rate conditions.

Figure 2B:
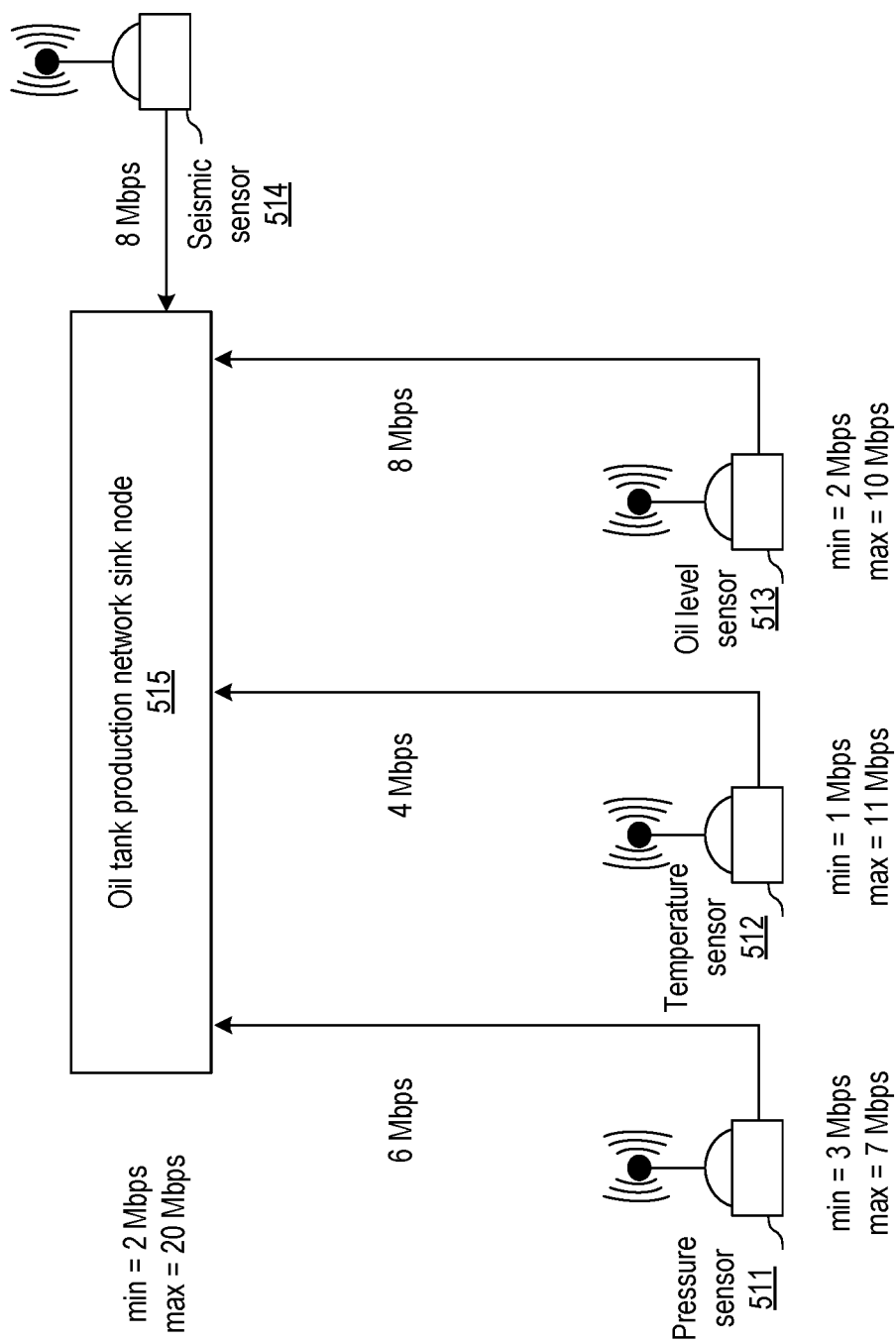
FIG. 2B is a schematic block diagram of a specific example of a data congestion control system according to an embodiment of the present invention.

Turning to FIG. 2B, suppose that an event occurs at a second time that is later than the first time, such as earthquake in the region. In response, a seismic sensor 514 begins to sends its data to its connected devices, including the oil tank production network sink node 515, at 8 Mbps. The seismic sensor can be implemented by utilizing the sensor devices 410 or 412 of FIG. 1. As the sink node 515 begins to receive data from the seismic sensor, the sink node 515 begins to receive data at a rate of 26 Mbps, which is outside of the boundary reception rate conditions. The sink node 515, in response to detecting that the received data rate is greater than its maximum reception rate of 20 Mbps, can automatically initiate an on-demand congestion negotiation process with its surrounding sending devices. In some embodiments, instead of or in addition to directly comparing a reception rate to the reception rate boundary conditions, the sink node 515 can determine to initiate the congestion negotiation process in response to other factors, such as in response to determining that memory capacity compares unfavorably to a threshold, in response to an error, in response to receiving instructions to begin initiation from an administrator or another device in the system, and/or in response to an automatically determined indication of congestion.

Once initiated, the negotiation process can include determining and/or evaluating four parameters: the sink node memory capacity, the required reduction in data receiving rate for the sink node such that the sink node is operating within the upper load threshold for the saturated memory resource, the data priority of the data types received by each of the sensor devices 511-514, and/or capacity of the sensor devices 511-514. The sink node 515 can thus determine that the required reduction in data receiving rate is 6 Mbps (The currently incoming 26 Mbps minus the maximum reception rate of 20 Mbps), and can determine the priorities of the sensor devices 511-514, for example, by fetching the corresponding data priorities from local memory, requesting from another device, or calculating as discussed herein, for example, based on the type of data received from each sensor. In this example, the sink node determines that the seismic data of the seismic sensor 514 has a highest priority p1, the pressure data of the pressure sensor 511 has a second highest priority p2, the temperature data of the temperature sensor has a third highest priority p3, and the oil level data of the oil level sensor has a lowest priority p4 (p1>p2>p3>p4). In this example, suppose that negotiation scores of sensor devices 511-514 are a function of these priorities of the respective sensor data, where the oil level sensor has the most favorable negotiation score, the pressure sensor has the second most favorable negotiation score, the temperature sensor has a third most favorable negotiation score, and the seismic sensor has the least favorable negotiation score.

The sink node 515 can identify the sensor device with the most favorable negotiation score from the set of negotiation scores, for example, by ranking the calculated priorities and/or negotiation scores, or by fetching a first or last entry of a sorted list of sensor devices or sorted list of sensor data types, sorted based on predetermined negotiation scores. The sink node can first begin negotiation with this identified sensor device, which in this case is the oil level sensor. The sink node can determine the current transmission rate of the oil level sensor is 8 Mbps, and can further determine that the minimum transmission rate of the oil level sensor is 2 Mbps. The sink node can perform a calculation or otherwise determine to request a reduced transmission rate, where the requested reduced transmission rate is lower than the current transmission rate of the oil level sensor and at least the minimum transmission rate of the oil level sensor. In this example, the sink node determines to request that the oil level sensor reduce its transmission to its minimum transmission rate of 2 Mbps. This request to reduce the transmission rate to the minimum transmission rate of 2 Mbps can be generated by the sink node 515 for transmission to the oil level sensor.

In response to receiving the request to reduce the transmission rate to the minimum transmission rate of 2 Mbps, the oil level sensor can determine to accept this request to reduce the transmission rate to the rate requested by the sink node, can determine to accept the request to reduce the transmission rate, but only agree to reduce the transmission rate by an amount that is smaller than the requested change in transmission rate, and/or can determine to deny the request completely and continue transmitting at the normal rate. In this example, suppose the oil level sensor determines to only reduce the rate by 4 Mbps, and thus begins transmit at a reduced rate of 4 Mbps. This partial reduction by the oil level sensor can be a result of determining that the proposed reduced rate of 2 Mbps compares unfavorably to quality of service and/or system requirements and that a reduced rate of 4 Mbps compares favorably to quality of service and/or system requirements.

Next, in response to determining that the oil level sensor has agreed transmit at a reduced rate of 4 Mbps, for example, based on receiving an acknowledgment transmission from the oil level sensor and/or based on otherwise determining the received rate has changed, the sink node can determine that the received rate is now 22 Mbps, and that a further reduction of at least 2 Mbps is necessary. The sink node can identify the temperature sensor as having the second most favorable negotiation score, and can determine to request that the temperature sensor reduce its transmission by the necessary 2 Mbps. A request to reduce the transmission rate by 2 Mbps can be generated by the sink node for transmission to the temperature sensor. Suppose the temperature sensor determines to accept this request to reduce its transmission rate from 4 Mbps to 2 Mbps, and begins transmitting at 2 Mbps in response. The sink node, upon determining that the temperature sensor has accepted the request and/or by otherwise determining that the received rate does not exceed the maximum reception rate and/or that congestion is under control, can determine to that no further negotiations are necessary. By conducting the negotiation process in this fashion, the sink node avoids data loss, quality of service metrics are honored for each device, and each device is able to operate within normal operating boundaries.

In response to determining that this transmission reduction is no longer necessary at a later time, for example, in response to determining that seismic sensor is no longer transmitting data and/or in response to determining that the received rate is well below the maximum reception rate, the sink node can send requests to the oil level sensor and temperature sensor to resume transmission at the normal and/or previous rate, and the temperature sensor and oil level sensor can resume transmissions at 4 Mbps and 8 Mbps in response. Alternatively, the oil level sensor and temperature sensors can also resume their normal transmission rates in response to a determined time window elapsing or otherwise determining that conditions are back to normal.

In various embodiments, a control device of a hierarchical sensor network includes at least one processor and a memory. The memory stores operational instructions, that when executed by the at least one processor cause the control device to receive data from a set of devices, where the data includes sensor data transmitted from each of the set of devices, and where the sensor data transmitted by the each of the set of devices corresponds to one of a plurality of sensor data types. A first aggregate data rate of the data received from the set of devices is determined to compare unfavorably to a congestion threshold. A set of negotiation scores corresponding to the set of devices is determined, wherein an order of the set of negotiation scores is based on priorities of corresponding ones of the plurality of sensor data types. A most favorable negotiation score of the set of negotiation scores is determined, and transmission rate boundary conditions of a one of the set of devices that corresponds to the most favorable negotiation score is determined.

A proposed reduced transmission rate is determined for the one of the set of devices. The proposed reduced transmission rate is less than a current transmission rate of the one of the set of devices and wherein the proposed reduced transmission rate compares favorably to the transmission rate boundary conditions of the one of the set of devices. A transmission rate reduction request is generated for transmission to the one of the set of devices that indicates the proposed reduced transmission rate. An updated aggregated data rate of the data received from the set of devices is determined. A difference between the updated aggregated data rate and the first aggregated data rate corresponds to a reduction of rate of transmission of the sensor data by the one of the set of devices in response to receiving the transmission rate reduction request.

When the updated aggregate data rate compares unfavorably to the congestion threshold, a set of additional transmission rate reduction requests are generated, each for transmission to a corresponding device of a subset of the set of devices. Each of the set of additional transmission rate reduction requests indicate an additional proposed reduced transmission rate, where each additional proposed reduced transmission rate is less than a current transmission rate of the corresponding device of the subset. Each additional proposed reduced transmission rate compares favorably to determined transmission rate boundary conditions for the corresponding device of the subset, and each of the set of additional transmission rate reduction requests is generated and transmitted one at a time, sequentially through the subset of the set of devices with respect to an order of the corresponding negotiation scores starting from a second most favorable negotiation score, until a most recent one of a plurality of subsequently determined updated data rates compares favorably to the congestion threshold. Each of the plurality of subsequently determined updated data rates are determined in response to the transmission of the each of the set of additional transmission rate reduction requests.

In various embodiments, the set of devices are associated with a first hierarchical level of the hierarchical sensor network. The control device is associated with a second hierarchical level of the hierarchical sensor network, and the first hierarchical level is one level lower than the second hierarchical level. In various embodiments, aggregated sensor data is generated based on the data received from the set of devices. The aggregated sensor data is transmitted to a gateway device. The gateway device is associated with a third hierarchical level of the hierarchical sensor network that is one level higher than the second hierarchical level, and the congestion threshold is based on a maximum transmission rate corresponding to transmission of the aggregated sensor data to the gateway device. In various embodiments, the gateway device is implemented by utilizing a second control device. A control device transmission rate reduction request is received from the gateway device, and the congestion threshold is updated by lowering the maximum transmission rate. The first aggregate data rate corresponds unfavorably to the congestion threshold as a result of the lowering of the maximum transmission rate. In various embodiments, the second hierarchical level includes a plurality of control devices that transmit aggregated sensor data to the gateway device, where each of the control devices receives data from one set of devices of a plurality of sets of devices. The plurality of sets of devices are associated with the first hierarchical level.

In various embodiments, the difference between the updated aggregated data rate and the first aggregated data rate is less than a second difference corresponding to the proposed reduced transmission rate subtracted from the first aggregated data rate.

In various embodiments, the set of devices includes a triggered device. The triggered device is operable to increase its rate of transmission of its sensor data in response to an occurrence of an event. The triggered device corresponds to a negotiation score of the set of negotiation scores that is less favorable than the most favorable negotiation score. At a first time, the control device determines that a previous aggregate data rate compares favorably to the congestion threshold. The triggered device transmits data at a first rate during the first time. At a second time that is more recent than the first time and that temporally corresponds to the occurrence of the event, the triggered device increases its rate of transmission from the first rate to a second rate. Determining that the first aggregate data rate compares unfavorably to the congestion threshold temporally corresponds to the second time, and the first aggregate data rate comparing unfavorably to the congestion threshold is a result of the increase in the rate of transmission by the triggered device from the first rate to the second rate. In various embodiments, the triggered device includes a seismic sensor, and the event is an earthquake.

In various embodiments, the set of devices correspond to a set of IoT sensor devices, and the control device is utilized to implement a sink node that communicates with the set of IoT sensor devices. In various embodiments, the hierarchical sensor network is located at an oil refinery. The control device is associated with an oil production tank sensor network or an oil compressor sensor network, and the set of IoT sensor devices monitor temperature, oil flow, and/or pressure.

Figure 3:
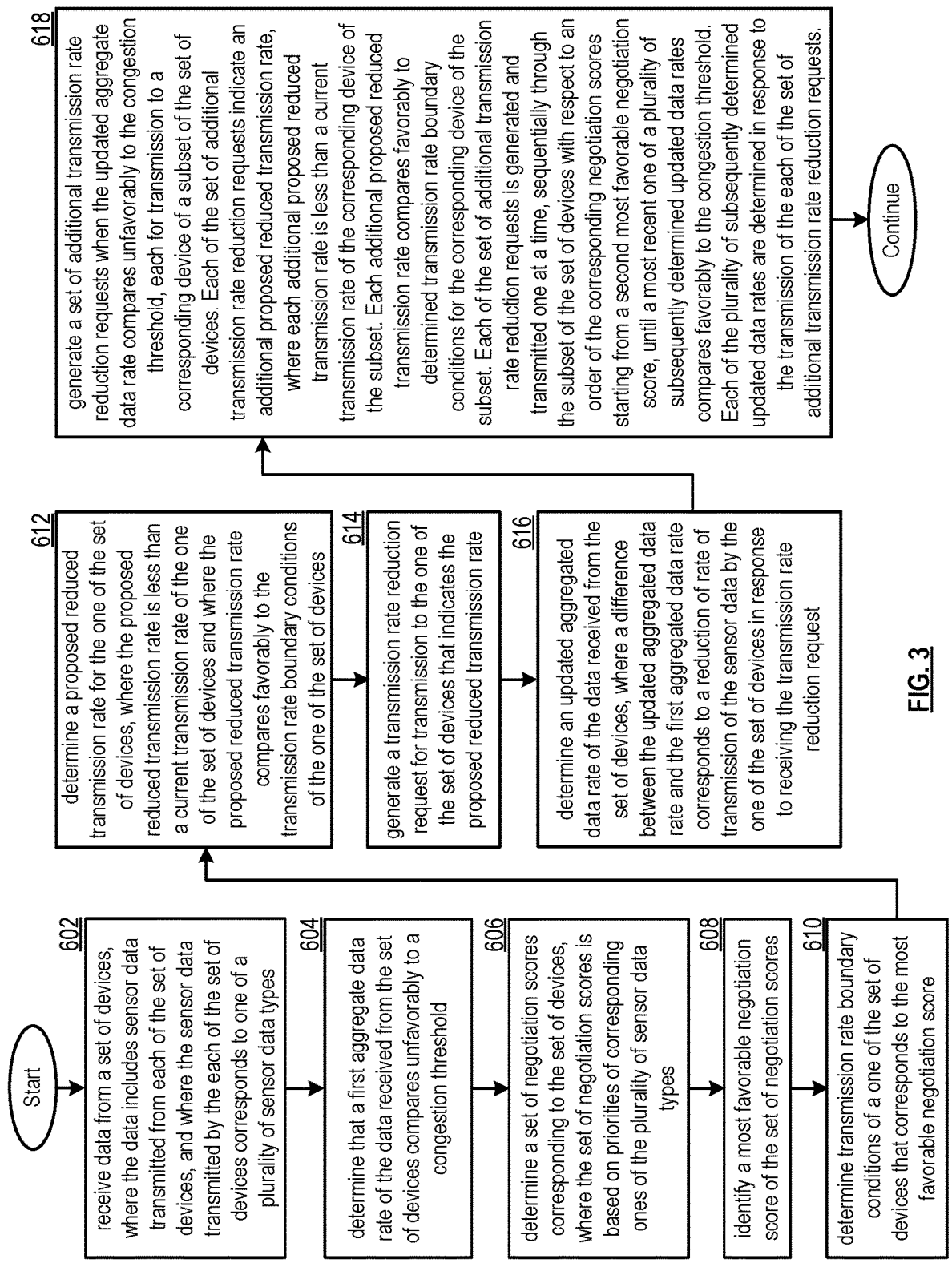
FIG. 3 is a logic diagram of an example of a method of performing data congestion control in accordance with the present invention.

FIG. 3 is a logic diagram of an example of a method of performing data congestion control. In particular, a method is presented for use in association with one or more functions and features described in conjunction with FIGS. 1-2B, for execution by a control device that includes a processor or via another device of a hierarchical sensor network that includes at least one processor and memory that stores instruction that configure the processor or processors to perform the steps described below.

Step 602 includes receiving data from a set of devices, where the data includes sensor data transmitted from each of the set of devices, and where the sensor data transmitted by the each of the set of devices corresponds to one of a plurality of sensor data types. Step 604 includes determining that a first aggregate data rate of the data received from the set of devices compares unfavorably to a congestion threshold. Step 606 includes determining a set of negotiation scores corresponding to the set of devices, where an order of the set of negotiation scores is based on priorities of corresponding ones of the plurality of sensor data types. Step 608 includes identifying a most favorable negotiation score of the set of negotiation scores. Step 610 includes determining transmission rate boundary conditions of a one of the set of devices that corresponds to the most favorable negotiation score. Step 612 includes determining a proposed reduced transmission rate for the one of the set of devices, where the proposed reduced transmission rate is less than a current transmission rate of the one of the set of devices and where the proposed reduced transmission rate compares favorably to the transmission rate boundary conditions of the one of the set of devices. Step 614 includes generating a transmission rate reduction request for transmission to the one of the set of devices that indicates the proposed reduced transmission rate. Step 616 includes determining an updated aggregated data rate of the data received from the set of devices, where a difference between the updated aggregated data rate and the first aggregated data rate corresponds to a reduction of rate of transmission of the sensor data by the one of the set of devices in response to receiving the transmission rate reduction request.

Step 618 includes generating a set of additional transmission rate reduction requests when the updated aggregate data rate compares unfavorably to the congestion threshold, each for transmission to a corresponding device of a subset of the set of devices. Each of the set of additional transmission rate reduction requests indicate an additional proposed reduced transmission rate, where each additional proposed reduced transmission rate is less than a current transmission rate of the corresponding device of the subset. Each additional proposed reduced transmission rate compares favorably to determined transmission rate boundary conditions for the corresponding device of the subset. Each of the set of additional transmission rate reduction requests is generated and transmitted one at a time, sequentially through the subset of the set of devices with respect to an order of the corresponding negotiation scores starting from a second most favorable negotiation score, until a most recent one of a plurality of subsequently determined updated data rates compares favorably to the congestion threshold. Each of the plurality of subsequently determined updated data rates are determined in response to the transmission of the each of the set of additional transmission rate reduction requests.

In various embodiments of the method, the set of devices are associated with a first hierarchical level of the hierarchical sensor network. The control device is associated with a second hierarchical level of the hierarchical sensor network, and the first hierarchical level is one level lower than the second hierarchical level. In various embodiments, aggregated sensor data is generated based on the data received from the set of devices. The aggregated sensor data is transmitted to a gateway device. The gateway device is associated with a third hierarchical level of the hierarchical sensor network that is one level higher than the second hierarchical level, and the congestion threshold is based on a maximum transmission rate corresponding to transmission of the aggregated sensor data to the gateway device. In various embodiments, the gateway device is implemented by utilizing a second control device. A control device transmission rate reduction request is received from the gateway device, and the congestion threshold is updated by lowering the maximum transmission rate. The first aggregate data rate corresponds unfavorably to the congestion threshold as a result of the lowering of the maximum transmission rate. In various embodiments, the second hierarchical level includes a plurality of control devices that transmit aggregated sensor data to the gateway device, where each of the control devices receives data from one set of devices of a plurality of sets of devices. The plurality of sets of devices are associated with the first hierarchical level.

In various embodiments of the method, the difference between the updated aggregated data rate and the first aggregated data rate is less than a second difference corresponding to the proposed reduced transmission rate subtracted from the first aggregated data rate.

In various embodiments of the method, the set of devices includes a triggered device. The triggered device is operable to increase its rate of transmission of its sensor data in response to an occurrence of an event. The triggered device corresponds to a negotiation score of the set of negotiation scores that is less favorable than the most favorable negotiation score. At a first time, the control device determines that a previous aggregate data rate compares favorably to the congestion threshold. The triggered device transmits data at a first rate during the first time. At a second time that is more recent that the first time and that temporally corresponds to the occurrence of the event, the triggered device increases its rate of transmission from the first rate to a second rate. Determining that the first aggregate data rate compares unfavorably to the congestion threshold temporally corresponds to the second time, and the first aggregate data rate comparing unfavorably to the congestion threshold is a result of the increase in the rate of transmission by the triggered device from the first rate to the second rate. In various embodiments, the triggered device includes a seismic sensor, and the event is an earthquake.

In various embodiments of the method, the set of devices correspond to a set of IoT sensor devices, and the control device is utilized to implement a sink node that communicates with the set of IoT sensor devices. In various embodiments, the hierarchical sensor network is located at an oil refinery. The control device is associated with an oil production tank sensor network or an oil compressor sensor network, and the set of IoT sensor devices monitor temperature, oil flow, and/or pressure.

Figure 4:
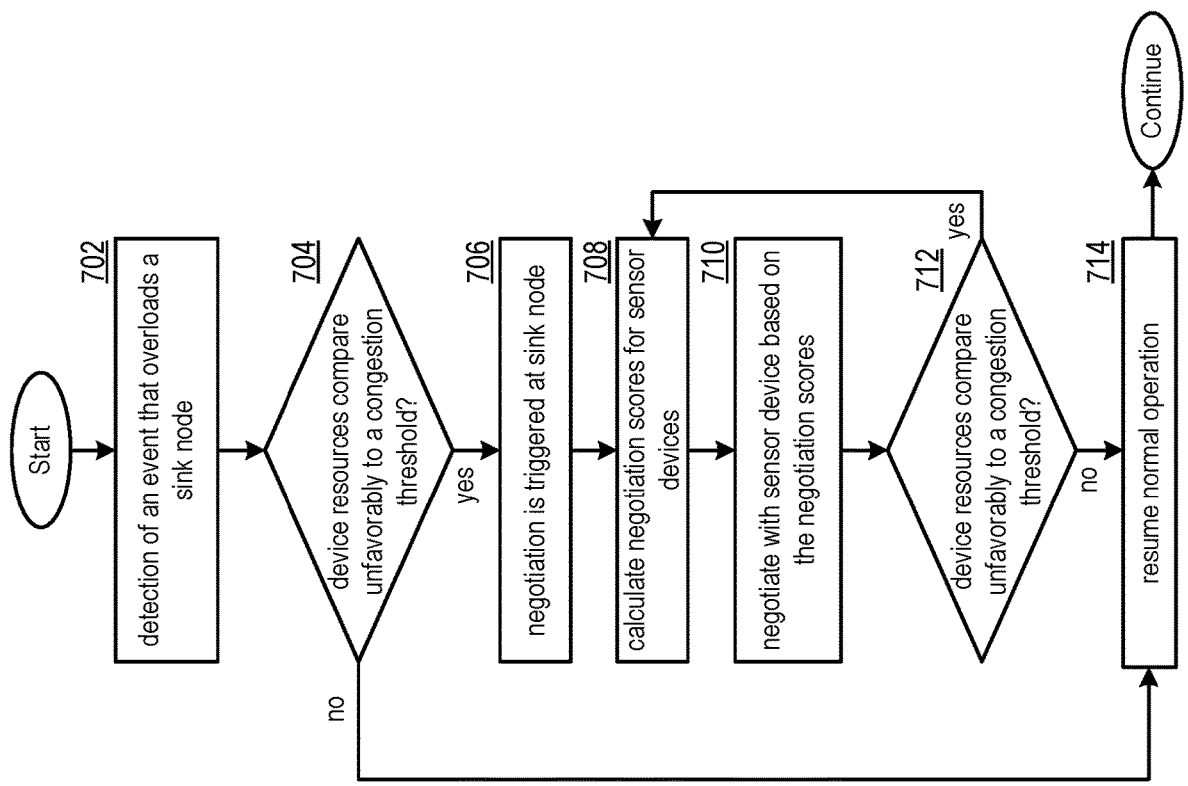
FIG. 4 is a logic diagram of an example of a method of performing data congestion control in accordance with the present invention.

FIG. 4 is a logic diagram of an example of a method of performing data congestion control for execution by one or more devices in a data congestion control system utilized by an IoT network as described herein. In step 702, an event that overloads a sink node of the IoT network is detected. In decision block 704, it is determined whether or not device resources, such as resources of the sink node or other devices of the IoT network, compare unfavorably to a congestion threshold. If no, the method proceeds to step 714 and normal operation continues. If yes, the method proceeds to step 706 where negotiation is triggered at the sink node. Step 708 includes calculating negotiation scores of the sensor devices transmitting to the sink node. Step 710 includes negotiating with devices based on the negotiation scores. For example, the sink node negotiates with the devices with most the favorable negotiation score, or a subset of devices with the most favorable set of negotiation scores, as discussed herein. In decision block 712, it is determined whether or not the device resources compare unfavorably to the congestion threshold. If yes, steps 708 and 710 are repeated to continue the negotiation process. If no, the method proceeds to step 714 and normal operation resumes, for example, where all sensor devices begin transmitting once again at their normal transmission rates as discussed herein.

Figure 5:
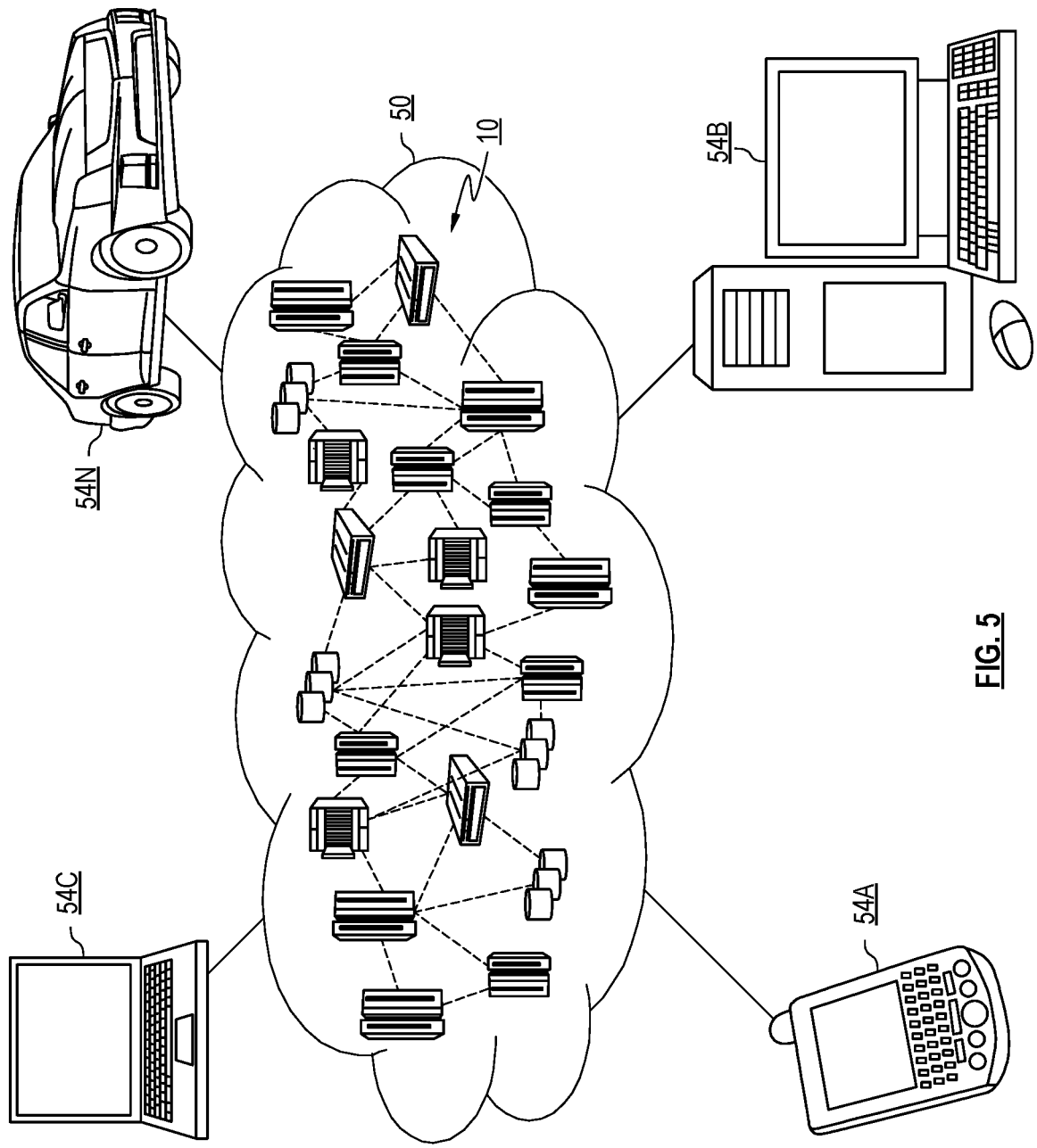
FIG. 5 depicts a cloud computing environment according to various embodiments of the present invention.

FIG. 5 presents an illustrative cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser). In some embodiments, the cloud computing environment 50 can be utilized to implement local sensor networks 450 and/or central network 460 of FIG. 1.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
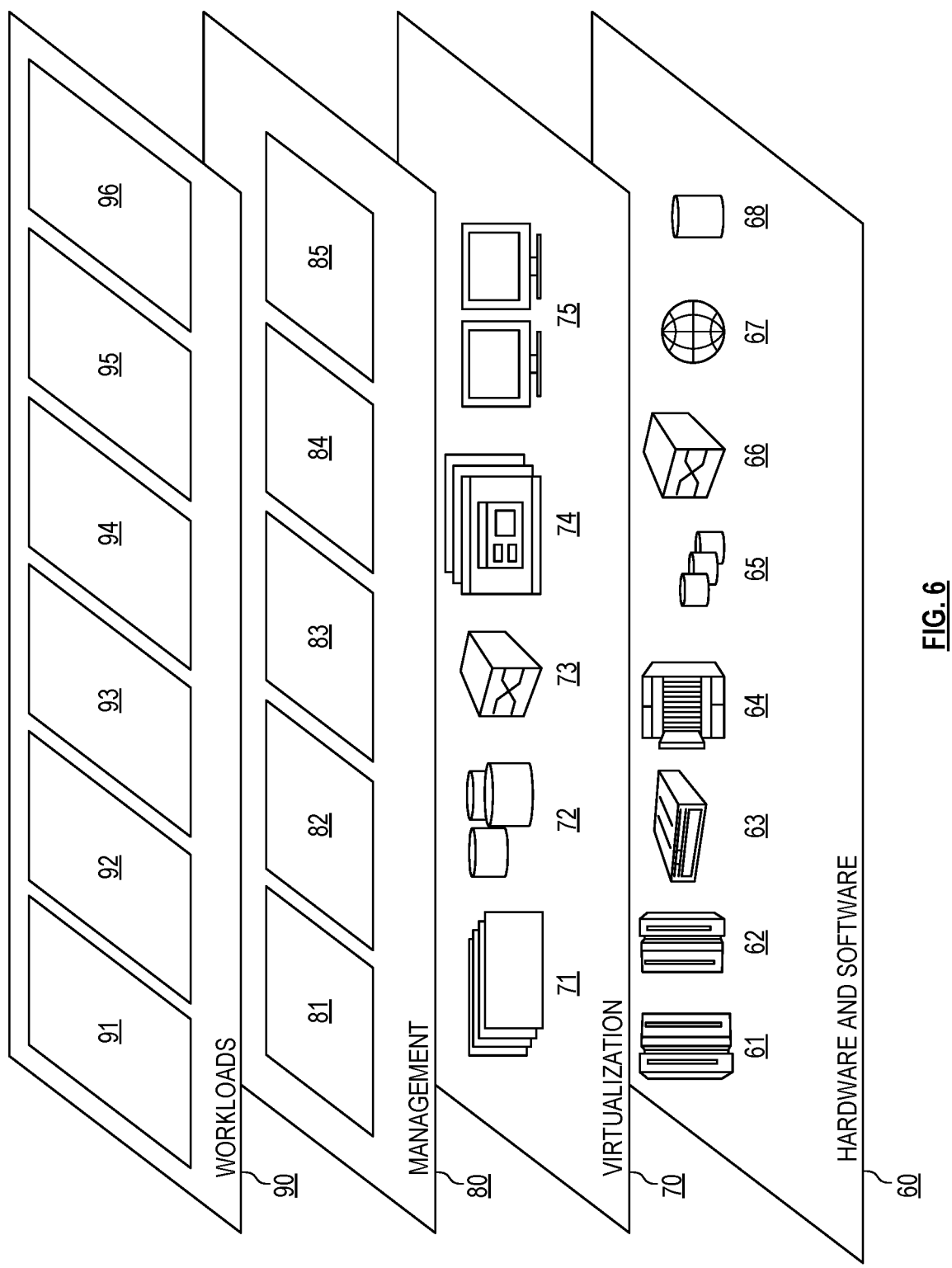
FIG. 6 depicts abstraction model layers according to various embodiments of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data congestion control 96. In some embodiments, some or all local sensor networks 450 can be implemented by utilizing the cloud computing environment 50, for example, by utilizing the data congestion control 96 of the workloads layer 90 to perform data congestion control, where some or all sensor devices 410 communicate with the network via a corresponding node 10 of the local sensor network 450. In some embodiments, oil tank production network sink node 515 can be implemented by utilizing a node 10.

Figure 7:
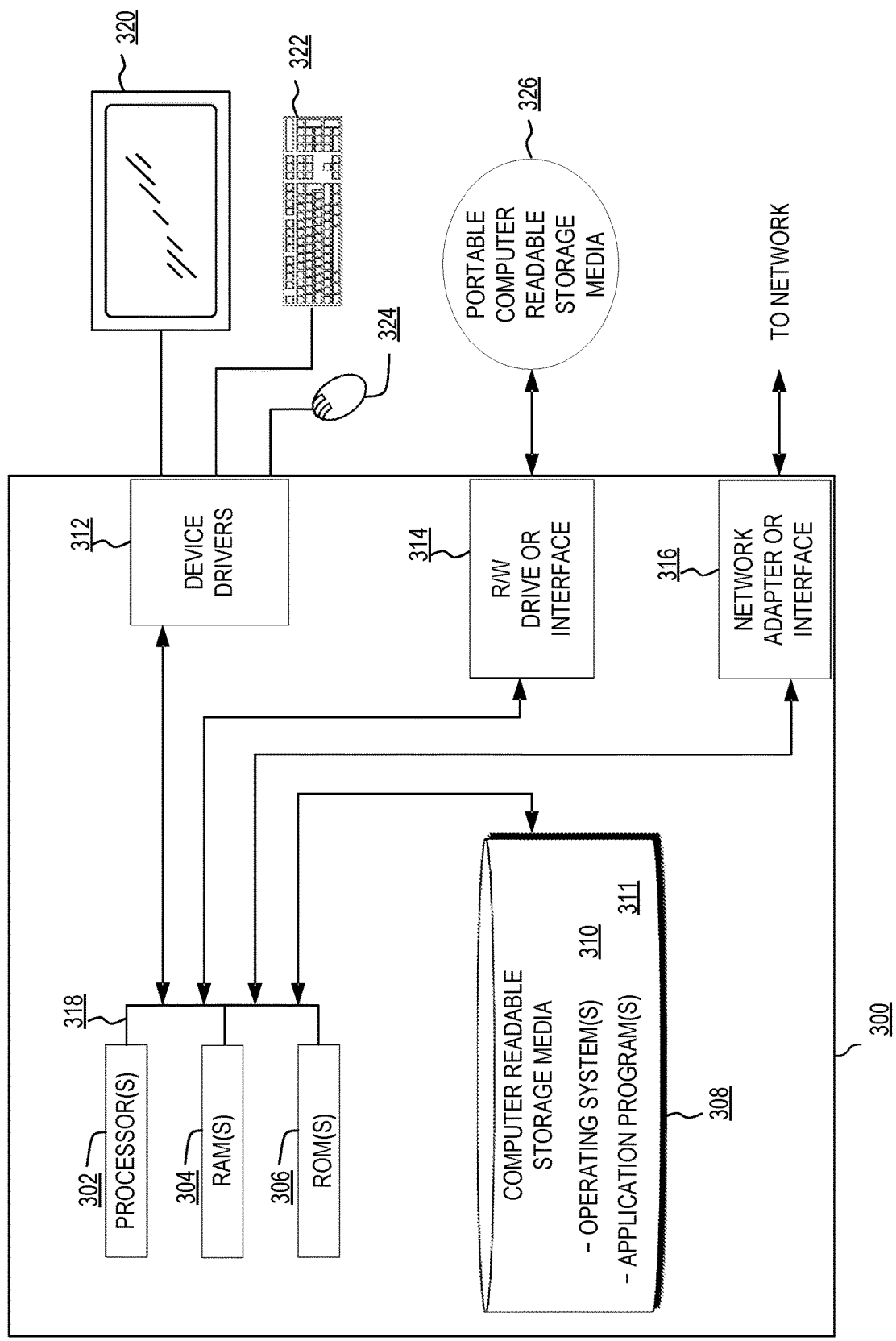
FIG. 7 depicts a block diagram of a computing device according to various embodiments of the present invention.

FIG. 7 depicts a block diagram of components of a computing device 300, which can be utilized to implement various computing devices described herein in accordance with an embodiment of the present invention in FIGS. 1-6. It should be appreciated that FIG. 7 provides only an illustration of one implementation and does not imply any limitations with regard to the environments in which different embodiments may be implemented. Many modifications to the depicted environment may be made.

Computing device 300 can include one or more processors 302, one or more computer-readable RAMs 304, one or more computer-readable ROMs 306, one or more computer readable storage media 308, device drivers 312, read/write drive or interface 314, and network adapter or interface 316, all interconnected over a communications fabric 318. Communications fabric 318 can be implemented with any architecture designed for passing data and/or control information between processors (such as microprocessors, communications and network processors, etc.), system memory, peripheral devices, and any other hardware components within the system.

One or more operating systems 310 and/or application programs 311, such as network application server software 67 and database software 68, are stored on one or more of the computer readable storage media 308 for execution by one or more of the processors 302 via one or more of the respective RAMs 304 (which typically include cache memory). In the illustrated embodiment, each of the computer readable storage media 308 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device 300 can also include a R/W drive or interface 314 to read from and write to one or more portable computer readable storage media 326. Application programs 311 on computing devices 300 can be stored on one or more of the portable computer readable storage media 326, read via the respective R/W drive or interface 314 and loaded into the respective computer readable storage media 308.

Computing device 300 can also include a network adapter or interface 316, such as a TCP/IP adapter card or wireless communication adapter. Application programs 311 on computing devices 54A-N can be downloaded to the computing device from an external computer or external storage device via a network (for example, the Internet, a local area network or other wide area networks or wireless networks) and network adapter or interface 316. From the network adapter or interface 316, the programs may be loaded into the computer readable storage media 308. The network may comprise copper wires, optical fibers, wireless transmission, routers, firewalls, switches, gateway computers and edge servers.

Computing device 300 can also include a display screen 320, a keyboard or keypad 322, and a computer mouse or touchpad 324. Device drivers 312 interface to display screen 320 for imaging, to keyboard or keypad 322, to computer mouse or touchpad 324, and/or to display screen 320 for pressure sensing of alphanumeric character entry and user selections. The device drivers 312, R/W drive or interface 314, and network adapter or interface 316 can comprise hardware and software stored in computer readable storage media 308 and/or ROM 306.

In some embodiments, the gateway device 430 of FIG. 1 can be implemented by one or more network interfaces, and can be implemented by utilizing computing device 300. In some embodiments, the central server 420 of FIG. 1 can be implemented by utilizing computing device 300. In some embodiments, some or all sensor devices 410, 412, and/or 414 of FIG. 1, and/or control device 415 of FIG. 1, can be implemented by utilizing computing device 300. In some embodiments, oil tank production network sink node 515, pressure sensor 511, temperature sensor 512, and/or oil level sensor 513 of FIGS. 2A-2B, and/or the seismic sensor 514 of FIG. 2B, can be implemented by utilizing computing device 300. In some embodiments, some or all of the cloud computing nodes 10 and/or some or all of the computing devices 54A-N of FIG. 5 can be implemented by utilizing computing device 300. In some embodiments, one or more hardware components of hardware and software layer 60 of FIG. 6 can be implemented by utilizing the computing device 300.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

The present invention may be a system, a method, and/or a computer program product at any possible technical detail level of integration. The computer program product may include a computer readable storage medium (or media) having computer readable program instructions thereon for causing a processor to carry out aspects of the present invention.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a control device of a hierarchical sensor network that includes a processor, the method comprises:
    receiving data from a set of devices, wherein the data includes sensor data transmitted from each of the set of devices, and wherein the sensor data transmitted by the each of the set of devices corresponds to one of a plurality of sensor data types;
    determining that a first aggregate data rate of the data received from the set of devices compares unfavorably to a congestion threshold;
    determining a set of negotiation scores corresponding to the set of devices, wherein the set of negotiation scores is based on priorities of corresponding ones of the plurality of sensor data types;
    identifying a most favorable negotiation score of the set of negotiation scores;
    determining transmission rate boundary conditions of a one of the set of devices that corresponds to the most favorable negotiation score;
    determining a proposed reduced transmission rate for the one of the set of devices, wherein the proposed reduced transmission rate is less than a current transmission rate of the one of the set of devices and wherein the proposed reduced transmission rate compares favorably to the transmission rate boundary conditions of the one of the set of devices;
    generating a transmission rate reduction request for transmission to the one of the set of devices that indicates the proposed reduced transmission rate;
    determining an updated aggregated data rate of the data received from the set of devices, wherein a difference between the updated aggregated data rate and the first aggregated data rate corresponds to a reduction of rate of transmission of the sensor data by the one of the set of devices in response to receiving the transmission rate reduction request; and
    when the updated aggregate data rate compares unfavorably to the congestion threshold:
        generating at least one additional transmission rate reduction request, for transmission to a corresponding device of a subset of the set of devices, wherein the at least one additional transmission rate reduction request indicates an additional proposed reduced transmission rate, wherein the additional proposed reduced transmission rate is less than a current transmission rate of the corresponding device of the subset, wherein the additional proposed reduced transmission rate compares favorably to determined transmission rate boundary conditions for the corresponding device of the subset, wherein the at least one additional transmission rate reduction request is generated and transmitted with respect to an order of the corresponding negotiation scores in accordance with a second most favorable negotiation score, until a subsequently determined updated data rates compares favorably to the congestion threshold.

2. The method of claim 1, wherein the set of devices are associated with a first hierarchical level of the hierarchical sensor network, wherein the control device is associated with a second hierarchical level of the hierarchical sensor network, and wherein the first hierarchical level is one level lower than the second hierarchical level.

3. The method of claim 2, further comprising:
generating aggregated sensor data based on the data received from the set of devices; and
transmitting the aggregated sensor data to a gateway device, wherein the gateway device is associated with a third hierarchical level of the hierarchical sensor network that is one level higher than the second hierarchical level, and wherein the congestion threshold is based on a maximum transmission rate corresponding to transmission of the aggregated sensor data to the gateway device.

4. The method of claim 3, wherein the gateway device is implemented by utilizing a second control device, further comprising:
receiving a control device transmission rate reduction request from the gateway device; and
updating the congestion threshold by lowering the maximum transmission rate;
wherein the first aggregate data rate corresponds unfavorably to the congestion threshold as a result of the lowering of the maximum transmission rate.

5. The method of claim 3, wherein the second hierarchical level includes a plurality of control devices that transmit aggregated sensor data to the gateway device, wherein each of the control devices receives data from one set of devices of a plurality of sets of devices, and wherein the plurality of sets of devices are associated with the first hierarchical level.

6. The method of claim 1, wherein the difference between the updated aggregated data rate and the first aggregated data rate is less than a second difference corresponding to the proposed reduced transmission rate subtracted from the first aggregated data rate.

7. The method of claim 1, wherein the set of devices includes a triggered device, wherein the triggered device is operable to increase its rate of transmission of its sensor data in response to an occurrence of an event, wherein the triggered device corresponds to a negotiation score of the set of negotiation scores that is less favorable than the most favorable negotiation score, the method further comprising:
determining, at a first time, that a previous aggregate data rate compares favorably to the congestion threshold;
wherein, at the first time, the triggered device transmits data at a first rate;
wherein, at a second time that is more recent that the first time and that temporally corresponds to the occurrence of the event, the triggered device increases its rate of transmission from the first rate to a second rate;
wherein the determining that the first aggregate data rate compares unfavorably to the congestion threshold temporally corresponds to the second time; and
wherein the first aggregate data rate comparing unfavorably to the congestion threshold is a result of the increase in the rate of transmission by the triggered device from the first rate to the second rate.

8. The method of claim 7, wherein the triggered device includes a seismic sensor, and wherein the event is an earthquake.

9. The method of claim 1, wherein the set of devices correspond to a set of Internet of Things (IoT) sensor devices, and wherein the control device is utilized to implement a sink node that communicates with the set of IoT sensor devices.

10. The method of claim 9, wherein the hierarchical sensor network is located at an oil refinery, wherein the control device is associated with one of: an oil production tank sensor network or an oil compressor sensor network, and wherein the set of IoT sensor devices monitor at least one of: temperature, oil flow, or pressure in the one of: the oil production tank sensor network or the oil compressor sensor network.

11. A control device of a hierarchical sensor network comprises:
at least one processor;
a memory that stores operational instructions, that when executed by the at least one processor cause the control device to:
receive data from a set of devices, wherein the data includes sensor data transmitted from each of the set of devices, and wherein each of the set of devices corresponds to one of a plurality of sensor data types;
determine that a first aggregate data rate of the data received from the set of devices compares unfavorably to a congestion threshold;
determine a set of negotiation scores corresponding to the set of devices, wherein the set of negotiation scores is based on priorities of corresponding ones of the plurality of sensor data types;
identify a most favorable negotiation score of the set of negotiation scores;
determine transmission rate boundary conditions of a one of the set of devices that corresponds to the most favorable negotiation score;
determine a proposed reduced transmission rate for the one of the set of devices, wherein the proposed reduced transmission rate is less than a current transmission rate of the one of the set of devices and wherein the proposed reduced transmission rate compares favorably to the transmission rate boundary conditions of the one of the set of devices;
generate a transmission rate reduction request for transmission to the one of the set of devices that indicates the proposed reduced transmission rate.

12. The control device of claim 11, wherein the memory that stores further operational instructions, that when executed by the at least one processor cause the control device to:
determine an updated aggregated data rate of the data received from the set of devices, wherein a difference between the updated aggregated data rate and the first aggregated data rate corresponds to a reduction of rate of transmission of the sensor data by the one of the set of devices in response to receiving the transmission rate reduction request; and generate a set of additional transmission rate reduction requests, each for transmission to a corresponding device of a subset of the set of devices when the updated aggregate data rate compares unfavorably to the congestion threshold, wherein each of the set of additional transmission rate reduction requests indicate an additional proposed reduced transmission rate, wherein each additional proposed reduced transmission rate is less than a current transmission rate of the corresponding device of the subset, wherein each additional proposed reduced transmission rate compares favorably to determined transmission rate boundary conditions for the corresponding device of the subset, wherein each of the set of additional transmission rate reduction requests is generated and transmitted one at a time, sequentially through the subset of the set of devices with respect to an order of the corresponding negotiation scores starting from a second most favorable negotiation score, until a most recent one of a plurality of subsequently determined updated data rates compares favorably to the congestion threshold, and wherein each of the plurality of subsequently determined updated data rates are determined in response to the transmission of the each of the set of additional transmission rate reduction requests.

13. The control device of claim 12, wherein the set of devices are associated with a first hierarchical level of the hierarchical sensor network, wherein the control device is associated with a second hierarchical level of the hierarchical sensor network, and wherein the first hierarchical level is one level lower than the second hierarchical level.

14. The control device of claim 13, wherein the operational instructions, when executed by the at least one processor, further cause the control device to:
generate aggregated sensor data based on the data received from the set of devices; and
transmit the aggregated sensor data to a gateway device, wherein the gateway device is associated with a third hierarchical level of the hierarchical sensor network that is one level higher than the second hierarchical level, and wherein the congestion threshold is based on a maximum transmission rate corresponding to transmission of the aggregated sensor data to the gateway device.

15. The control device of claim 14, wherein the gateway device is implemented by utilizing a second control device, and wherein the operational instructions, when executed by the at least one processor, further cause the control device to:
receive a control device transmission rate reduction request from the gateway device; and
update the congestion threshold by lowering the maximum transmission rate;
wherein the first aggregate data rate corresponds unfavorably to the congestion threshold as a result of the lowering of the maximum transmission rate.

16. The control device of claim 14, wherein the second hierarchical level includes a plurality of control devices that transmit aggregated sensor data to the gateway device, wherein each of the control devices receives data from one set of devices of a plurality of sets of devices, and wherein the plurality of sets of devices are associated with the first hierarchical level.

17. The control device of claim 12, wherein the difference between the updated aggregated data rate and the first aggregated data rate is less than a second difference corresponding to the proposed reduced transmission rate subtracted from the first aggregated data rate.

18. The control device of claim 12, wherein the set of devices includes a triggered device, wherein the triggered device is operable to increase its rate of transmission of its sensor data in response to an occurrence of an event, wherein the triggered device corresponds to a negotiation score of the set of negotiation scores that is less favorable than the most favorable negotiation score, and wherein the operational instructions, when executed by the at least one processor, further cause the control device to:
determine, at a first time, that a previous aggregate data rate compares favorably to the congestion threshold;
wherein, at the first time, the triggered device transmits data at a first rate;
wherein, at a second time that is more recent that the first time and that temporally corresponds to the occurrence of the event, the triggered device increases its rate of transmission from the first rate to a second rate;
wherein the determining that the first aggregate data rate compares unfavorably to the congestion threshold temporally corresponds to the second time; and
wherein the first aggregate data rate comparing unfavorably to the congestion threshold is a result of the increase in the rate of transmission by the triggered device from the first rate to the second rate.

19. The control device of claim 18, wherein the triggered device includes a seismic sensor, and wherein the event is an earthquake.

20. The control device of claim 11, wherein the set of devices correspond to a set of Internet of Things (IoT) sensor devices, and wherein the control device is utilized to implement a sink node that communicates with the set of IoT sensor devices, wherein the hierarchical sensor network is located at an oil refinery, wherein the control device is associated with one of: an oil production tank sensor network or an oil compressor sensor network, and wherein the set of IoT sensor devices monitor at least one of: temperature, oil flow, or pressure in the one of: the oil production tank sensor network or the oil compressor sensor network.

* * * * *